United States Patent

[11] 3,607,814

| | | |
|---|---|---|
| [72] | Inventor | Roland Ralph DiLeone<br>Rowayton, Conn. |
| [21] | Appl. No. | 799,896 |
| [22] | Filed | Feb. 17, 1969 |
| [45] | Patented | Sept. 21, 1971 |
| [73] | Assignee | American Cyanamid Company |

[54] COMPOSITION OF MATTER COMPRISING A SOLUTION OF A POLYIMIDE IN A MIXTURE OF SOLVENTS
2 Claims, No Drawings

| | | |
|---|---|---|
| [52] | U.S. Cl. | 260/30.4 N,<br>260/32.8 N, 260/78 TF |
| [51] | Int. Cl. | C08g 51/32,<br>C08g 51/34 |
| [50] | Field of Search | 260/30.4 N,<br>32.8 N, 78 TF |

[56] References Cited
UNITED STATES PATENTS 3,498,948  3/1970  Minami et al............... 260/30.4 N

*Primary Examiner*—Allen Lieberman
*Attorney*—James T. Dunn

ABSTRACT: A composition of matter comprising a solution of a polyimide of a 3,4-dicarboxy-1,2,3,4-tetrahydro-1-naphthalene succinic dianhydride and a diprimary diamine in the presence of a mixture of solvents comprising butyrolactone and a ketone selected from the group consisting of acetophenone, isopharone, benzophenone propiophenone and cyclohexanone in certain proportions and solids.

3,607,814

COMPOSITION OF MATTER COMPRISING A SOLUTION OF A POLYIMIDE IN A MIXTURE OF SOLVENTS

CROSS-REFERENCES TO RELATED APPLICATIONS

This application is related to the instant applicant's application Ser. No. 730,635 filed May 20, 1968 now U.S. Pat. No. 3,501,443 issued Mar. 17, 1970. Said case shows the preparation of the polyimides of the present invention in the latter category of solvent and removing the solvent therefrom. This application is also related to the instant applicant's copending application Ser. No. 589,521 filed Oct. 26, 1966. Said application is directed to the polyimides of 3,4-dicarboxy-1,2,3,4-tetrahydro-1-naphthalene succinic dianhydride and a diprimary diamine. Both of the aforementioned copending applications are incorporated herein by reference.

BACKGROUND OF THE INVENTION

Polyimides have been prepared according to the prior art by reacting one or more dianhydrides of tetracarboxylic acids with a diprimary diamine. These polyimides have been prepared by reacting the essential ingredients in bulk and in organic solvents. However, certain organic solvents which have been used in the past have proven to be solvents for the essential reactants but have proven to be nonsolvents for the polyimides and even for some of the intermediate reaction products developed by preliminary reaction by the dianhydrides with the diamines before the polyimides have been completely formed. The result has been that the polyimide intermediate reaction product precipitates out of the solvent which has then become a nonsolvent and further reaction to form the polyimide completely is prevented resulting in the preparation of low molecular weight materials of diminished value and utility. If the polyimide is not removed from the solvent it can be used in the form of a solution as a coating composition, an adhesive or a laminating polymeric solution.

FIELD OF THE INVENTION

This invention is in the field of a composition of matter comprising a polyimide of certain dianhydrides of tetracarboxylic acids and a diprimary diamine dissolved in a mixture of certain organic solvents, which solutions will find utility in a plurality of different fields such as coatings, adhesives and laminates.

DESCRIPTION OF THE PRIOR ART

Of collateral interest, the U.S. Pat. No. 3,179,632 is the closest reference of which the instant applicant is aware other than his copending applications referred to hereinabove.

SUMMARY OF THE INVENTION

A composition of matter comprising a solution of polyimide of a 3,4-dicarboxy-1,2,3,4-tetrahydro-1-naphthalene succinic dianhydride and a diprimary diamine dissolved in a mixture of solvents comprising (A) from about 20 percent to about 60 percent by weight of butyrolactone and (B) correspondingly from about 80 percent to about 40 percent by weight of solvent selected from the group consisting of cyclohexanone, acetophenone, isopharone, benzophenone and propiophenone wherein the solids content of the polyimide in solution is between about 5 percent and 30 percent by weight based on the total weight of solution. If the polyimides prepared according to the process of the present invention are to be used as coating compositions, such a coating is completely prepared when the imidization reaction is complete as indicated by the removal of substantially all of the theoretical water of imidization from the solution. At that point the polyimide is already dissolved in the solvent selected as the reaction medium and upon addition of the butyrolactone the solution can be used to coat appropriate substrates such as wood, glass, metal, and the like; and upon heating the films thus deposited on the substrates at a temperature high enough to evaporate the mixture of solvents, the film of the polyimide is left remaining on the substrate.

Certain solvents such as acetone, methyl ethyl ketone and ethyl acetate, while solvents for the reactants are not solvents for the polymer. As a result they do not permit the synthesis of high molecular weight polymer nor do they allow the imidization to go to completion. Other solvents such as dimethylformamide, dimethyl acetamide, dimethyl sulfoxide, pyridine and the like, while solvents for both of the reactants used to prepare these polyimides are also solvents for the polyimides per se, but they do not permit one to achieve high molecular weight completely imidized polyimide. The reason for this appears to be that these solvents are not totally inert in that they do dissolve the water of imidization. In turn, the generated water causes hydrolysis of the polymer thus limiting the extent of polymerization and imidization. A 100 percent conversion of reactants to polyimide using such solvents is not practical because the polymer that results has a melt temperature in excess of 300° C.; and as a consequence, at this temperature thermal and oxidated degradation would be a serious problem.

In preparing the solutions of the present invention, one may utilize a 3,4,-dicarboxy-1,2,3,4-tetrahydro-1-naphthalene succinic dianhydride, which is referred to hereinbelow as tetralin dianhydride for simplicity and sometimes as TDA for brevity. These dianhydrides will be referred to as TDA per se when the actual compound 3,4-dicarboxy-1,2,3,4-tetrahydro-13,4-naphthalene succinic dianhydride is used and as alkyl substituted TDA when the TDA is substituted in the 6 or 7 position with an alkyl group containing from 1 to 7 carbon atoms. It is preferred that a TDA be used as the sole dianhydride in reaction with the diprimary diamine to produce the most desirable polyimides of the present invention. However, other dianhydrides may be used with the TDA in coreaction with the diprimary diamine but there should be at least 10 mol percent of the TDA present based on the total mols of dianhydrides used to prepare the polyimides. Among the other non-TDA dianhydrides which may be used in the practice of the process of the present invention are the following: pryomellitic dianhydride; 2,3,-6,7-naphthalene tetracarboxylic dianhydride; 3,3',4,4'1,2,5,6-naphthalene tetracarboxylic dianhydride; 2,2'3,3'-diphenyl tetracarboxylic dianhydride; 2,2-bis(3,4-dicarboxyphenyl) propane dianhydride; bis(3,4-dicarboxyphenyl) sulfone dianhydride; 3,4,9.10-perylene tetracarboxylic dianhydride; bis(3,4-dicarboxyphenyl) ether dianhydride; ethylene tetracarboxylic dianhydride; naphthalene-1,2,4,5-tetracarboxylic dianhydride; naphthalene-1,4,5,8-tetracarboxylic dianhydride; decahydronaphthalene-1,4,5,8-tetracarboxylic dianhydride; 4,8-dimethyl-1,2,3,5,6,7-hexahydronaphthalene-1,2,5,6-tetracarboxylic dianhydride; 2,6-dichloro-naphthalene-1,4,5,8-tetracarboxylic dianhydride; 2,7-dichloro-naphthalene-1,4,5,8-tetracarboxylic dianhydride; 2,3,6,7-tetrachloro-naphthalene-1,4,5,8-tetracarboxylic dianhydride; phenanthrene-1,8,9,10-tetracarboxylic dianhydride; cyclopentane-1,2,3,4-tetracarboxylic dianhydride; pyrrolidine-2,3,4,5-tetracarboxylic dianhydride; pyrazine-2,3,5,6-tetracarboxylic dianhydride; 2,2-bis(2,3-dicarboxyphenyl) propane dianhydride; 1,1-bis(2,3-dicarboxyphenyl) ethane dianhydride; 1,1-bis(3,4-dicarboxyphenyl) ethane dianhydride; bis(2,3-dicarboxyphenyl) methane dianhydride; bis-(3,4-dicarboxyphenyl) methane dianhydride; bis(3,4-dicarboxyphenyl) sulfone dianhydride; benzene-1,2,3,4-tetracarboxylic dianhydride; 1,2,3,4-butane tetracarboxylic dianhydride; thiophene-2,3,4,5-tetracarboxylic dianhydride; and the like and mixtures thereof.

The second essential component used in the process of the present invention is a diprimary diamine having the structural formula:

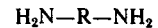

in which R is a divalent organic radical. Among the specific diprimary diamines which may be used in the practice of the process of the present invention are: metaphenylene diamine; para-phenylene diamine; 4,4'-diamino-diphenyl propane; 4,4'-diamino-diphenyl methane; benzidine; 4,4'-diamino-diphenyl sulfide; 4,4'-diamino-diphenyl sulfone; 3,3'-diamino-diphenyl sulfone; 4,4'-diamino-diphenyl ether; 2,6-diaminopyridine; bis(4-amino-phenyl)diethyl silane; bis-(4-amino-phenyl)phosphine oxide; bis-(4-amino-phenyl)-N-methylamine; 1,5-diamino naphthalene; 3,3'-dimethyl-4,4'-diamino-biphenyl; 3,3'-dimethoxy benzidine; 2,4-bis(beta-amino-t-butyl)toluene; bis-(para-beta-amino-t-butyl-phenyl)ether; para-bis(2-methyl-4-amino-pentyl)-benzene; para-bis-(1,1-dimethyl-5-amino-pentyl)benzene; m-xylylene diamine; p-xylylene diamine; bis(para-amino-cyclohexyl) methane; hexamethylene diamine; heptamethylene diamine; octa-methylene diamine; nonamethylene diamine; decamethylene diamine; 3-methyl-heptamethylene diamine; 4,4'-dimethylheptamethylene diamine; 2,11-diamino-dodecane; 1,2-bis-(3-aminopropoxy)ethane; 2,2-dimethyl propylene diamine; 3-methoxyhexamethylene diamine; 2,5-dimethylhexamethylene diamine; 2,5dimethylheptamethylene diamine; 5-methylnonamethylene diamine; 1,4-diamino-cyclohexane; 1,12-diamino-octadecane; 2,5-diamino-1,3,4-oxadiazole; $H_2N(CH_2)_3O(CH_2)_2O(CH_2)_3NH_2$; $H_2N(CH_2)_3S(CH_2)_3H_2$; $H_2N(CH_2)_3N(CH_3)(CH_2)_3NH_2$; and mixtures thereof.

In reacting the TDA with the diprimary diamine whether alone or in admixture with other dianhydrides or other diprimary diamines the total number of mols of the dianhydride should be substantially the same as the total number of mols of the diprimary diamine. In other words, the dianhydrides and the diamines are used on a 1:1 mol basis. Slight departures from this mol ratio can be utilized by using a slight excess such as about 5-10 mol percent of either the dianhydride or the diamine.

In preparing the composition of the present invention, one could introduce the TDA and the diprimary diamine into a selected amount of a solvent chosen from the group consisting of acetophenone, cyciohexanone, isopharone, propiophenone and benzophenone. These solvents can be used either singly or in combination with one another. The amount of the solvent used may be varied so as to provide a final solids content between about 5 percent and 30 percent. To achieve such a solids content, one would therefore need to use between about 70 percent and 95 percent of one or more of the above recited solvents in order to provide this solids content range. Preferably one would utilize 80 percent to 85 percent of the solvent so as to provide a solids content of 15 percent to 20 percent wherein all percentages are by weight based on the total weight of solution. In preparing the solutions of the present invention, one would carry out the polyimide imidization reaction in the absence of the butyrolactone and upon the completion of the imidization reaction one would then add the butyrolactone in an amount varying between 15 percent and 60 percent butyrolactone and preferably between about 20 percent and 30 percent butyrolactone. When this mixture of solvents is used as the dispersing medium, the polymer retains its comparatively high molecular weight and does not lose other physical properties whereas when solvents like dimethyl acetamide or dimethyl formamide N-methyl pyrrolidone are used, they do cause the polymer to lose weight and results in other physical properties and are therefore avoided; notwithstanding the fact that these other solvents prove to be good solvents for the polyimide.

In order that the concept of the present invention may be more completely understood, the following examples are set forth in which all parts are parts by weight unless otherwise indicated.

EXAMPLE 1

Into a suitable reaction vessel equipped with a stirrer, condenser and Dean-Stark trap and thermometer, there is introduced 450 parts of tetralin dianhydride and 1,047 parts of cyclohexanone. The mixture is then heated to about 80° C. at which point 297 parts of methylene dianiline are added and 20 parts of pyridine. The mixture is then allowed to react. Water, which is the byproduct of the reaction, starts to distill over when the temperature reaches 120° C. When all of the theoretical water has distilled over, the temperature reaches the reflux temperature of the cyclohexanone (155° C.). At this point the reaction is allowed to continued for an additional 2 hours beyond the time it takes to collect the theoretical water. When the reaction is completed (in about 5 hours), the solution is diluted to 20 percent solids with a mixture of 550 parts of butyrolactone and 1,170 parts of cyclohexanone. The final solution had the following properties: solids 20 by weight, solvent composition 80 percent cyclohexanone and 20 percent butyrolactone by weight, viscosity 2,400 centipoises. The viscosity remains stable after aging for 10 weeks at 60 C. A film is drawn down from the solution thus prepared on a glass plate and the film is air dried to produce a clear, tough film of the polyimide.

EXAMPLE 2

Example 1 is repeated in all essential details except that in the place of the cyclohexanone there was used an equivalent amount of acetophenone. A quantity of titanium dioxide is incorporated into the final solution; and again, a film is drawn down on a metal plate and air-dried to give a pigmented film.

EXAMPLE 3

Example 1 is repeated in all essential details except that acetophenone is substituted for cyclohexanone.

EXAMPLE 4

Example 1 is repeated in all essential details except that 300 parts of 4,4'-diaminodiphenyl ether is substituted for the methylene dianiline.

I claim:

1. A composition of matter comprising a solution of polyimide of (a) 3,4-dicarboxy-1,2,3,4-tetrahydro- 1-naphthalene succinic dianhydride or its alkyl substituted counterparts wherein the alkyl substitution is in the 6 or 7 position and wherein the alkyl substituent is an alkyl group containing from 1 to 7 carbon atoms and a diprimary diamine dissolved in a mixture of solvents comprising (A) from about 20 percent to about 60 percent by weight of butyrolactone and (B) correspondingly from about 80 percent to about 40 percent by weight of solvent selected from the group consisting of cyclohexanone, acetophenone, isopharone, benzophenone and propiophenone wherein the solids content of the polyimide in solution is between about 5 percent and 30 percent by weight based on the total weight of solution.

2. The composition according to claim 1 in which the solids content of the polyimide in solution is between about 15 percent and 20 percent by weight based on the total weight of solution.

UNITED STATES PATENT OFFICE
CERTIFICATE OF CORRECTION

Patent No. 3,607,814          Dated September 21, 1971

Inventor(s) Roland Ralph Di Leone

It is certified that error appears in the above-identified patent and that said Letters Patent are hereby corrected as shown below:

Column 1, line 12, after 1966 insert (Attorney's Docket No. 21,749). Column 2, line 24, " -13,4- " should be -- -1- --; Column 2, line 37 " pryomellitic " should be -- pyromellitic -- ; Column 2, line 39, " 4'1,2,5,6- " should be -- 4'-diphenyl tetracarboxylic dianhydride; 1,2,5,6- -- ; Column 2, line 43 " 9.10 " should be -- 9,10 --. Column 3, line 19, " $_3H_2$ " should be -- $_3-NH_2$ ; --.

Signed and sealed this 28th day of March 1972.

(SEAL)
Attest:

EDWARD M. FLETCHER, JR.              ROBERT GOTTSCHALK
Attesting Officer                    Commissioner of Patents